United States Patent
Komemushi et al.

(10) Patent No.: US 12,320,660 B2
(45) Date of Patent: Jun. 3, 2025

(54) INFORMATION PROCESSING DEVICE

(71) Applicant: SHIMANO Inc., Sakai (JP)

(72) Inventors: Takashi Komemushi, Sakai (JP); Kazuhiro Takeda, Sakai (JP)

(73) Assignee: Shimano Inc., Sakai (JP)

( * ) Notice: Subject to any disclaimer, the term of this patent is extended or adjusted under 35 U.S.C. 154(b) by 224 days.

(21) Appl. No.: 16/503,582

(22) Filed: Jul. 4, 2019

(65) Prior Publication Data
US 2020/0011691 A1    Jan. 9, 2020

(30) Foreign Application Priority Data

| Jul. 9, 2018 | (JP) | 2018-130244 |
| Jul. 9, 2018 | (JP) | 2018-130245 |
| Jul. 9, 2018 | (JP) | 2018-130246 |
| Dec. 18, 2018 | (JP) | 2018-236760 |

(51) Int. Cl.
*G06N 20/00* (2019.01)
*G01C 21/34* (2006.01)
*G01C 21/36* (2006.01)

(52) U.S. Cl.
CPC ....... *G01C 21/3492* (2013.01); *G01C 21/343* (2013.01); *G01C 21/3469* (2013.01); *G01C 21/3691* (2013.01); *G06N 20/00* (2019.01)

(58) Field of Classification Search
CPC .............. G01C 21/3492; G01C 21/343; G01C 21/3469; G01C 21/3691; G06N 20/00
See application file for complete search history.

(56) References Cited

U.S. PATENT DOCUMENTS

| 6,047,230 A | 4/2000 | Spencer et al. |
| 9,975,603 B2 | 5/2018 | Bortolozzo et al. |
| 2003/0236613 A1* | 12/2003 | Satoh ............... G08G 1/096866 340/995.13 |
| 2007/0245835 A1* | 10/2007 | Hauschildt ............... A43B 3/44 73/862.391 |
| 2012/0136566 A1 | 5/2012 | Bamba |
| 2012/0239290 A1 | 9/2012 | Fujita |
| 2012/0252544 A1* | 10/2012 | Yuen ..................... H04L 67/125 455/575.8 |
| 2016/0144915 A1* | 5/2016 | Bejestan ................ G09B 9/058 340/432 |

(Continued)

FOREIGN PATENT DOCUMENTS

| DE | 102016102470 A1 | 8/2017 |
| JP | H0717459 A | 1/1995 |

(Continued)

*Primary Examiner* — Kito R Robinson
*Assistant Examiner* — Roy Rhee
(74) *Attorney, Agent, or Firm* — Alleman Hall & Tuttle LLP

(57) ABSTRACT

An information processing device includes an input device and an artificial intelligence processing unit including a processor. The input device is configured to input first information related to at least one of a state of a human-powered vehicle, a rider of the human-powered vehicle, and an environment of the human-powered vehicle. The artificial intelligence processing unit is configured to generate second information related to a recommended travel condition of the human-powered vehicle in accordance with the first information received from the input device.

15 Claims, 7 Drawing Sheets

(56) References Cited

U.S. PATENT DOCUMENTS

| | | | |
|---|---|---|---|
| 2016/0375308 A1* | 12/2016 | Anderson | A63B 24/0075 |
| | | | 482/5 |
| 2017/0261990 A1* | 9/2017 | Lei | G05D 1/0214 |
| 2018/0170212 A1 | 6/2018 | Liu et al. | |
| 2019/0315431 A1* | 10/2019 | Vijaya Kumar | B62M 6/45 |
| 2019/0384303 A1* | 12/2019 | Muller | G06K 9/00791 |
| 2019/0389535 A1* | 12/2019 | Moening | B62M 6/50 |

FOREIGN PATENT DOCUMENTS

| | | |
|---|---|---|
| JP | H07017459 A | 1/1995 |
| JP | 2005127873 A | 5/2005 |
| JP | 2009019920 A | 1/2009 |
| JP | 2012013481 A | 1/2012 |
| JP | 2012113516 A | 6/2012 |
| JP | 2012117848 A | 6/2012 |
| JP | 2012159413 A | 8/2012 |
| WO | 2011067842 A1 | 6/2011 |

* cited by examiner

INFORMATION PROCESSING DEVICE

BACKGROUND ART

The present disclosure relates to an information processing device.

For example, patent document 1 describes an information processing device that stores maximum speeds of a human-powered vehicle. A user sets one of the stored maximum speeds as a target speed.

Japanese Laid-Open Patent Publication No. 7-17459

SUMMARY OF THE DISCLOSURE

With the information processing device described in patent document 1, a condition selected by the user simply becomes a travel condition of the human-powered vehicle. Thus, there is room for improvement in the usability.

One object of the present disclosure is to provide an information processing device that improves the usability.

An information processing device in accordance with a first aspect of the present disclosure comprises an input device and an artificial intelligence processing unit including a processor. The input device is configured to input first information related to at least one of a state of a human-powered vehicle, a rider of the human-powered vehicle, and an environment of the human-powered vehicle. The artificial intelligence processing unit is configured to generate second information related to a recommended travel condition of the human-powered vehicle in accordance with the first information received from the input device.

The information processing device in accordance with the first aspect generates the second information related to the recommended travel condition of the human-powered vehicle from the first information related to at least one of the state of the human-powered vehicle, the rider of the human-powered vehicle, and the environment of the human-powered vehicle with the artificial intelligence processing unit in a preferred manner. This improves the usability.

In accordance with a second aspect of the present disclosure, the information processing device according to the first aspect is configured so that the recommended travel condition includes at least one of a recommended travel route, a recommended travel distance, a recommended travel speed, a recommended travel time, a recommended cadence, a recommended human driving force, and a recommended assist mode.

The information processing device in accordance with the second aspect generates the second information related to at least one of the recommended travel route, the recommended travel distance, the recommended travel speed, the recommended travel time, the recommended cadence, the recommended human driving force, and the recommended assist mode with the artificial intelligence processing unit in a preferred manner.

In accordance with a third aspect of the present disclosure, the information processing device according to the first or second aspect further comprises an output device that outputs the second information generated by the artificial intelligence processing unit.

The information processing device in accordance with the third aspect outputs the second information from the output device.

In accordance with a fourth aspect of the present disclosure, the information processing device according to the third aspect is configured so that the output device includes at least one of a display and a speaker.

The information processing device in accordance with the fourth aspect can display the second information as an image on the display or output the second information as sound through the speaker.

In accordance with a fifth aspect of the present disclosure, the information processing device according to any one of the first to fourth aspects is configured so that the information related to at least one of the state of the human-powered vehicle, the rider of the human-powered vehicle, and the environment of the human-powered vehicle includes information related to at least one of a travel state of the human-powered vehicle and a state of the rider of the human-powered vehicle. Further, the input device is electrically connected to a detector that is configured to detect at least one of the travel state of the human-powered vehicle and the state of the rider of the human-powered vehicle.

The information processing device in accordance with the fifth aspect generates the second information corresponding to at least one of the travel state of the human-powered vehicle and the state of the rider of the human-powered vehicle detected by the detector.

In accordance with a sixth aspect of the present disclosure, the information processing device according to the fifth aspect is configured so that the travel state of the human-powered vehicle includes at least one of a travel time, a travel speed, a travel distance, a travel cadence, and a travel route.

The information processing device in accordance with the sixth aspect generates the second information corresponding to at least one of the travel time, the travel speed, the travel distance, the travel cadence, and the travel route of the human-powered vehicle.

In accordance with a seventh aspect of the present disclosure, the information processing device according to the fifth or sixth aspect is configured so that the state of the rider of the human-powered vehicle includes at least one of a human driving force, a state of fatigue, and consumed energy.

The information processing device in accordance with the seventh aspect generates the second information corresponding to at least one of the human driving force, the state of fatigue, and the consumed energy of the rider of the human-powered vehicle.

In accordance with an eighth aspect of the present disclosure, the information processing device according to any one of the first to seventh aspects is configured so that the artificial intelligence processing unit generates the second information in accordance with the history of the first information.

The information processing device in accordance with the eighth aspect generates the second information corresponding to the history of the first information.

In accordance with a ninth aspect of the present disclosure, the information processing device according to the eighth aspect further comprises first storage that stores the history of the first information.

The information processing device in accordance with the ninth aspect generates the second information corresponding to the history of the first information stored in the first storage.

In accordance with a tenth aspect of the present disclosure, the information processing device according to the eighth or ninth aspect further comprises a first communication unit configured to obtain the history of the first information input to the input device by performing communication and transmit the obtained history of the first information to the artificial intelligence processing unit.

The information processing device in accordance with the tenth aspect generates the second information in accordance with the history of the first information obtained by the first communication unit.

In accordance with an eleventh aspect of the present disclosure, the information processing device according to the second aspect further comprises second storage that stores map information. Further, the artificial intelligence processing unit generates the recommended travel route in accordance with the map information stored in the second storage.

The information processing device in accordance with the eleventh aspect generates the recommended travel route in accordance with the map information stored in the second storage in a preferred manner.

In accordance with a twelfth aspect of the present disclosure, the information processing device according to any one of the first to eleventh aspects is configured so that the first information includes information related to the environment of the human-powered vehicle. Further, the information related to the environment of the human-powered vehicle includes at least one of weather information, map information, and traffic information.

The information processing device in accordance with the twelfth aspect generates the second information in accordance with at least one of the weather information, the map information, and the traffic information.

In accordance with a thirteenth aspect of the present disclosure, the information processing device according to the twelfth aspect is configured so that the input device further includes a second communication unit configured to obtain the information related to the environment of the human-powered vehicle from an external device by performing communication and transmit the obtained information related to the environment of the human-powered vehicle to the artificial intelligence processing unit.

The information processing device in accordance with the thirteenth aspect generates the second information in accordance with the information related to the travel environment of the human-powered vehicle obtained by the second communication unit.

In accordance with a fourteenth aspect of the present disclosure, the information processing device according to the twelfth or thirteenth aspect is configured so that the map information includes road-related information.

The information processing device in accordance with the fourteenth aspect generates the second information in accordance with the map information including the road-related information.

In accordance with a fifteenth aspect of the present disclosure, the information processing device according to any one of the first to fourteenth aspects is configured so that the first information includes information related to the rider of the human-powered vehicle. Further, the information related to the rider of the human-powered vehicle includes information related to an exercise target of the rider.

The information processing device in accordance with the fifteenth aspect generates the second information in accordance with the information related to the exercise target of the rider.

In accordance with a sixteenth aspect of the present disclosure, the information processing device according to any one of the first to fifteenth aspects is configured so that the information related to at least one of the state of the human-powered vehicle, the rider of the human-powered vehicle, and the environment of the human-powered vehicle includes at least one of position information of the human-powered vehicle, information of the time at which the rider starts traveling, and information of a distance over which the rider wishes to travel.

The information processing device in accordance with the sixteenth aspect generates the second information in accordance with at least one of the position information of the human-powered vehicle, the information of the time at which the rider starts traveling, and the information of the distance over which the rider wishes to travel.

In accordance with a seventeenth aspect of the present disclosure, the information processing device according to the second aspect is configured so that the input device is configured to obtain information related to a predetermined travel route from an external device. Further, the artificial intelligence processing unit generates the recommended travel route in accordance with the information related to the predetermined travel route obtained from the external device.

The information processing device in accordance with the seventeenth aspect generates the recommended travel route in accordance with the information related to the predetermined travel route obtained from the external device.

In accordance with an eighteenth aspect of the present disclosure, the information processing device according to the second aspect is configured so that the input device is configured to obtain information related to a plurality of predetermined travel routes from an external device. Further, the artificial intelligence processing unit generates the recommended travel route by selecting a predetermined travel route from the information related to the plurality of predetermined travel routes obtained from the external device.

The information processing device in accordance with the eighteenth aspect generates the recommended travel route by selecting a predetermined travel route from the information related to the plurality of predetermined travel routes obtained from the external device.

In accordance with a nineteenth aspect of the present disclosure, the information processing device according to any one of the first to eighteenth aspects is configured so that the artificial intelligence processing unit is configured to be provided on the human-powered vehicle.

With the information processing device in accordance with the nineteenth aspect, a user can easily obtain the second information.

In accordance with a twentieth aspect of the present disclosure, the information processing device according to any one of the first to eighteenth aspects is configured so that the artificial intelligence processing unit is included in a server connected to a personal computer or the Internet.

The information processing device in accordance with the twentieth aspect allows for an increase in the processing speed for generation of the second information.

The information processing device in accordance with the present disclosure improves the usability.

EMBODIMENTS OF THE DISCLOSURE

Figure 1:
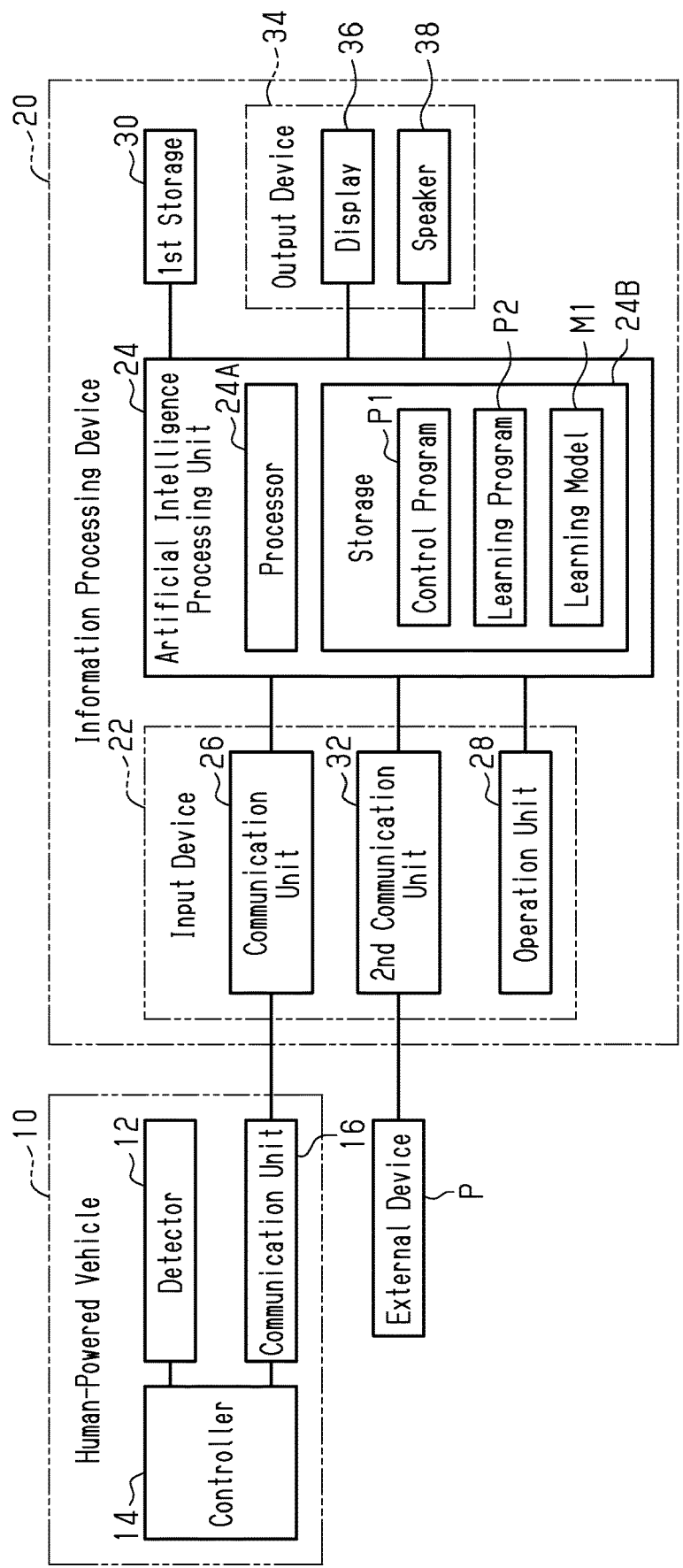
FIG. 1 is a block diagram showing the electrical configuration of an information processing system including an information processing device in accordance with a first embodiment.
Figure 2:
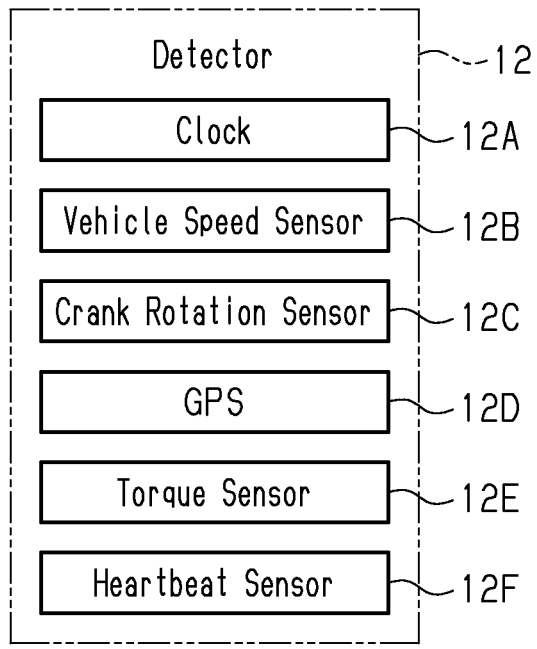
FIG. 2 is a schematic block diagram of a detector shown in FIG. 1.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

First Embodiment

An information processing device 20 in accordance with a first embodiment will now be described with reference to FIGS. 1 to 5. The information processing device 20 processes information related to a human-powered vehicle 10. The human-powered vehicle 10 is a vehicle that can be driven by at least human driving force. There is no limit to the number of wheels of the human-powered vehicle 10. For example, the human-powered vehicle 10 can be a unicycle or a vehicle having three or more wheels. Examples of the human-powered vehicle 10 include various types of bicycles such as a mountain bike, a road bike, a city bike, a cargo bike, and a recumbent bicycle, as well as an electric bicycle (e-bike). The electric bicycle includes an electric assist bicycle that assists propulsion of the vehicle with an electric motor. In the embodiments described hereafter, the human-powered vehicle 10 will be referred to as a bicycle.

The information processing device 20 includes an input device 22 and an artificial intelligence processing unit 24. The input device 22 is configured to input first information related to at least one of a state of the human-powered vehicle 10, a rider of the human-powered vehicle 10, and an environment of the human-powered vehicle 10. The artificial intelligence processing unit 24 is configured to generate second information related to a recommended travel condition of the human-powered vehicle 10 in accordance with the first information received from the input device 22.

The artificial intelligence processing unit 24 is configured to be provided on the human-powered vehicle 10. In this case, the information processing device 20 includes a smartphone. The information processing device 20 can include at least one of a tablet computer and a cycle computer instead of a smartphone. In this case, the artificial intelligence processing unit 24 is provided in a housing of at least one of a smartphone, a tablet computer, and a cycle computer included in the information processing device 20. At least one of the information processing device 20 and the human-powered vehicle 10 includes a mount for the information processing device 20 on the human-powered vehicle 10. The mount attaches the information processing device 20 on the human-powered vehicle 10 in a detachable manner. The artificial intelligence processing unit 24 can be provided on the human-powered vehicle 10 in a non-detachable manner.

The artificial intelligence processing unit 24 includes a processor 24A that executes a predetermined control program. The processor 24A, for example, includes a central processing unit (CPU) or a micro-processing unit (MPU). The processor 24A includes a graphics processing unit (GPU) in addition to the CPU or MPU. The processor 24A can include a field-programmable gate array (FPGA). The artificial intelligence processing unit 24 can include one or more processors 24A. The artificial intelligence processing unit 24 can include a plurality of the processors 24A located at separate positions.

The artificial intelligence processing unit 24 further includes storage 24B. The storage 24B stores a predetermined control program P1, a learning program P2, and a learning model M1. The storage 24B stores information used for various processes. The storage 24B, for example, includes a nonvolatile memory and a volatile memory. The artificial intelligence processing unit 24 updates the learning model M1, which is used to generate the second information in accordance with the received first information, through a learning algorithm based on the learning program P2. The learning algorithm includes machine learning, deep learning, and deep reinforcement learning. The learning algorithm, for example, includes at least one of supervised learning, unsupervised learning, and reinforcement learning. A method other than that described in the present specification can be used as long as the learning algorithm is configured to use a method from the field of artificial intelligence to update the learning model M1. The learning process for updating the learning model M1 is preferably executed by the GPU. The learning algorithm can use a neural network (NN). The learning algorithm can use a recurrent neural network (RNN).

The artificial intelligence processing unit 24 is actuated in a learning mode and a control mode. In a case where the artificial intelligence processing unit 24 is actuated in the learning mode, the artificial intelligence processing unit 24 functions as a generation unit that generates the learning model M1 through a learning algorithm based on the learning program P2 and updates the learning model M1. In a case where the artificial intelligence processing unit 24 is actuated in the control mode, the artificial intelligence processing unit 24 functions as a controller that processes the input information received at the input device 22 using the learning model M1 based on the control program P1 and has the output information output.

In one example, the information related to at least one of the state of the human-powered vehicle 10, the rider of the human-powered vehicle 10, and the environment of the human-powered vehicle 10 includes information related to at least one of a travel state of the human-powered vehicle 10 and a state of the rider of the human-powered vehicle 10. The input device 22 is electrically connected to a detector that is configured to detect at least one of the travel state of the human-powered vehicle 10 and the state of the rider of the human-powered vehicle 10.

The detector 12 can be provided on the human-powered vehicle 10. Preferably, the human-powered vehicle 10 further includes a controller 14, which is electrically connected to the detector 12, and a communication unit 16. The controller 14 includes a processor that executes a predetermined control program. The processor, for example, includes a CPU or MPU. The controller 14 can include one or more microcomputers. The controller 14 can include a plurality of processors located at separate positions. The controller 14 has the communication unit 16 transmit an output from the detector 12 to the input device 22. The detector 12 can be electrically connected to the input device 22 so that the output from the detector 12 is directly input to the input device 22. In this case, for example, the input device 22 includes a port that allows for connection of an electric cable connected to the detector 12. The detector 12 can be provided on the information processing device 20 or the rider of the human-powered vehicle 10.

Preferably, the input device 22 includes a communication unit 26 that is configured to communicate with the communication unit 16 of the human-powered vehicle 10. The communication unit 16 of the human-powered vehicle 10 is electrically connected to the communication unit 26 of the input device 22 through at least one of wireless communication or wired communication. The communication unit 26 of the input device 22, for example, obtains information detected by the detector 12 through the communication unit 16 of the human-powered vehicle 10. One example of the standard of the wireless communication between the communication unit 16 of the human-powered vehicle 10 and the communication unit 26 of the input device 22 is ANT+ (registered trademark) or Bluetooth (registered trademark).

In one example, the travel state of the human-powered vehicle 10 includes at least one of a travel time, a travel speed, a travel distance, a travel cadence, and a travel route. The travel time, for example, includes at least one of a cumulative value of the travel time per trip and a cumulative value of the travel time per day. The travel speed, for example, includes at least one of a travel speed detected in each predetermined cycle and an average value of the travel speed in a predetermined period. The travel distance, for example, includes at least one of a cumulative value of the travel distance per trip and a cumulative value of the travel distance per day. The travel cadence, for example, includes at least one of the travel cadence detected in predetermined each cycle and an average value of the travel cadence in a predetermined period. The travel route includes at least one of a travel route for one trip or a travel route for one day. The travel route can include information related to at least one of gradient, curves, and lanes of the traveling road that the human-powered vehicle 10 can travel.

In one example, the state of the rider of the human-powered vehicle 10 includes at least one of a human driving force, a state of fatigue, and consumed energy. The human driving force, for example, includes at least one of a human driving force detected in each predetermined cycle, an average value of the human driving force in a predetermined period, a cumulative value of the human driving force per trip, and a cumulative value of the human driving force per day. The state of fatigue, for example, includes heartrate. The consumed energy, for example, includes at least one of power based on the human driving force detected in each predetermined cycle, an average value of the power based on the human driving force in a predetermined period, a cumulative value of the power based on the human driving force per trip, and a cumulative value of the power based on the human driving force per day.

In one example, the first information includes information related to the rider of the human-powered vehicle 10. The information related to the rider of the human-powered vehicle 10 includes information related to an exercise target of the rider. The information related to the exercise target of the rider, for example, includes a weight target for one day or predetermined days, a target consumed energy in one day or predetermined days, and a target travel time of the human-powered vehicle 10.

In a case where the first information includes the information related to the exercise target of the rider, the information is preferably input to the input device 22 by an operation of a user. Preferably, the input device 22 includes an operation unit 28 that is operable by the user. The operation unit 28 includes at least one of a touch panel, a button, and a keyboard. In a state in which an application to input the first information to the information processing device 20 is executed, the user decides the exercise target and inputs the information related to the exercise target of the rider with the operation unit 28. In a case where the first information includes the information related to the exercise target of the rider, the input device 22 can be configured to receive information from a processing unit that sets the information related to the exercise target. In this case, the processing unit sets the information related to the exercise target of the rider from the information related to the rider. The information related to the rider, for example, includes information related to weight, age, a desired training strength, and the like and is input in advance by the user through an interface or the like. Then, the processing unit outputs the information related to the exercise target of the rider to the input device 22. The processing unit can be included in the information processing device 20 or an external device P.

In one example, the information related to at least one of the state of the human-powered vehicle 10, the rider of the human-powered vehicle 10, and the environment of the human-powered vehicle 10 includes at least one of position information of the human-powered vehicle 10, information of the time at which the rider starts traveling, and information of a distance over which the rider wishes to travel. The position information of the human-powered vehicle 10, for example, includes at least one of the present position of the human-powered vehicle 10, the position at which the human-powered vehicle 10 is to start traveling, and the position at which the human-powered vehicle 10 has started travelling.

In a case where the first information includes at least one of the position information of the human-powered vehicle 10, the information of the time at which the rider starts traveling, and the information of the distance over which the rider wishes to travel, it is preferred that the input device 22 receive information from an interface that is operable by the user. In a state in which an application to input the first information to the information processing device 20 is executed, the user inputs at least one of the position information of the human-powered vehicle 10, the information of the time at which the rider starts traveling, and the distance over which the rider wishes to travel with the operation unit 28.

Table 1 shows examples of the first information. The first information can include multiple pieces of information shown in table 1.

TABLE 1

| First Information | | |
|---|---|---|
| Information Related to at least One of | Travel State of Human-Powered | Travel Time |

TABLE 1-continued

| First Information | | |
|---|---|---|
| State of Human-Powered Vehicle, Rider of Human-Powered Vehicle, and Environment of Human-Powered Vehicle | Vehicle State of Rider of Human-Powered Vehicle Position Information of Human-Powered Vehicle Information of Time at which Rider Starts Traveling Distance over which Rider Wishes to Travel | Human Driving Force |
| Information Related to Rider of Human-Powered Vehicle | Exercise Target of Rider | |

The detector 12 is provided on the human-powered vehicle 10 or the rider. Table 2 shows examples of combinations of the detector 12 and the information related to at least one of the travel state of the human-powered vehicle 10 and the state of the rider of the human-powered vehicle 10. The detector 12 includes at least one of a clock 12A, a vehicle speed sensor 12B, a crank rotation sensor 12C, a global positioning system (GPS) device 12D, a torque sensor 12E, and a heartbeat sensor 12F. At least one of the clock 12A and the GPS device 12D can be provided on the information processing device 20. In this case, the clock 12A and the GPS device 12D are connected to the input device 22.

TABLE 2

| First Information | | Detector |
|---|---|---|
| Travel State of Human-Powered Vehicle | Travel Time | Clock |
| | Travel Speed | Vehicle Speed Sensor |
| | Travel Distance | Vehicle Speed Sensor, Clock |
| | Travel Cadence | Crank Rotation Sensor |
| | Travel Route | GPS Device |
| State of Rider of Human-Powered Vehicle | Human Driving Force | Torque Sensor |
| | State of Fatigue | Heartbeat Sensor |
| | Consumed Energy | Torque Sensor, Crank Rotation Sensor |

The clock 12A detects time.

The vehicle speed sensor 12B detects information related to a rotational speed of a wheel of the human-powered vehicle 10. The vehicle speed sensor 12B outputs a signal corresponding to the rotational speed of the wheel. The vehicle speed sensor 12B can calculate the vehicle speed of the human-powered vehicle 10 based on the rotational speed of the wheel. The vehicle speed sensor 12B preferably includes a magnetic reed that forms a reed switch or a Hall element. The vehicle speed sensor can be configured to be mounted on a chainstay of a frame of the human-powered vehicle 10 and detect a magnet attached on a rear wheel. Alternatively, the vehicle speed sensor can be configured to be provided on a front fork and detect a magnet attached on a front wheel.

The crank rotation sensor 12C detects information related to a rotational speed of a crank. The crank rotation sensor 12C is mounted on a housing on which the frame or a motor of the human-powered vehicle 10 is provided. The crank rotation sensor 12C is configured to include a magnetic sensor that outputs a signal corresponding to the strength of the magnetic field. A ring-shaped magnet of which the magnetic field strength changes in a circumferential direction is provided on a crankshaft or a member rotated in cooperation with the crankshaft. Alternatively, the ring-shaped magnet is provided in a power transmission path between the crankshaft and a front sprocket. The crank rotation sensor 12C outputs a signal corresponding to the rotational speed of the crank. The magnet can be provided on the member that rotates integrally with the crankshaft in the power transmission path of the human driving force between the crankshaft and the front sprocket. For example, in a case where a one-way clutch is not provided between the crankshaft and the front sprocket, the magnet can be provided on the front sprocket. The crank rotation sensor can include an optical sensor, an acceleration sensor, a torque sensor, and the like instead of the magnetic sensor.

The GPS device 12D obtains GPS information. The GPS device 12D can detect the position of the human-powered vehicle 10 on a map in accordance with the GPS information obtained at a GPS receiver and pre-stored map information.

The torque sensor 12E detects information related to torque based on the human driving force input to the crank. In a case where a one-way clutch is provided in the power transmission path, the torque sensor 12E is provided, for example, at an upstream side of the one-way clutch in the power transmission path. The torque sensor 12E includes a torsion sensor, a magnetostrictive sensor, a pressure sensor, and the like. The torsion sensor, for example, includes a torsion gauge. The torque sensor 12E is provided on a member included in the power transmission path or near the member included in the power transmission path. The member included in the power transmission path includes, for example, the crankshaft, a crank arm, and a pedal. The torque sensor 12E can include a wireless or wired communication unit.

The heartbeat sensor 12F detects information related to the heartbeat of the rider. The information related to the heartbeat of the rider includes information related to the heartrate of the rider. The heartbeat sensor 12F is, for example, configured to be attached to the body of the rider or a handlebar of the human-powered vehicle 10. The heartbeat sensor 12F can include a wireless or wired communication unit. The communication unit of the heartbeat sensor 12F, for example, can be configured in a manner allowing for communication with a cycle computer mounted on the human-powered vehicle 10. The information related to the heartbeat detected by the heartbeat sensor 12F can be displayed on the cycle computer.

Preferably, the artificial intelligence processing unit 24 generates the second information in accordance with the history of the first information. The information processing device 20 further includes first storage 30 that stores the history of the first information. The first storage 30, for example, includes a nonvolatile memory and a volatile memory. The first storage 30 can be included in the artificial intelligence processing unit 24. In this case, the first storage 30 can be included in the storage 24B.

In one example, the first information includes information related to the environment of the human-powered vehicle 10. The information related to the environment of the human-powered vehicle 10 includes at least one of weather information, map information, and traffic information. In this case, the input device 22 preferably further includes a second communication unit 32 configured to obtain the information related to the environment of the human-powered vehicle 10 from the external device P by performing communication and transmit the obtained information related to the environment of the human-powered vehicle 10 to the artificial intelligence processing unit 24.

The external device P, for example, includes a predetermined server. In this case, the second communication unit 32 is configured to be connected to the Internet and obtains the information related to the environment of the human-powered vehicle 10 from the external device P via the Internet. The second communication unit 32 can include a wireless communication unit for connection with the Internet.

The weather information includes at least one of a temperature, humidity, direction of wind, wind velocity, and rain cloud. The map information includes road-related information. The road-related information includes information related to at least one of a road map, gradient of the road surface, and types of the road. The traffic information includes at least one of information related to traffic congestion and information related to road closures. The second communication unit 32 obtains at least one of the weather information, the map information, and the traffic information from an appropriate server via the Internet or the like.

In a case where the first information includes the information related to the environment of the human-powered vehicle 10, the artificial intelligence processing unit 24 generates the second information in accordance with at least one of the information related to the environment of the human-powered vehicle 10 at a position where the human-powered vehicle 10 has traveled in the past or the information related to the environment of the human-powered vehicle 10 at a position where the human-powered vehicle 10 is scheduled to travel.

The information processing device 20 further includes an output device 34 that outputs the second information generated by the artificial intelligence processing unit 24. In one example, the output device 34 includes at least one of a display 36 and a speaker 38. In a case where the operation unit 28 includes a touch panel, the touch panel and the display 36 can be integrated into a monolithic structure.

The recommended travel condition includes at least one of a recommended travel route, a recommended travel distance, a recommended travel speed, a recommended travel time, a recommended cadence, a recommended human driving force, and a recommended assist mode.

The recommended travel route is, for example, displayed on a map on the display 36. The information related to the recommended travel distance, the recommended travel speed, the recommended travel time, the recommended cadence, the recommended human driving force, and the recommended assist mode are, for example, shown on the display 36 as characters. The assist mode, under a predetermined condition, includes a plurality of assist modes having different ratios of assisting force to the human driving force. The information related to the recommended travel distance, the recommended travel speed, the recommended travel time, the recommended cadence, the recommended human driving force, and the recommended assist mode are, for example, output with sounds from the speaker 38. As the information related to the recommended travel route, the name and the like of a travel route can be shown on the display 36 as characters or be output from the speaker 38 as sound. A general term and the like of a travel route include a name of a road, a name of a course, and the like.

Table 3 shows combinations of examples of the second information and presentation methods through the output device 34 to the user. The second information can include multiple pieces of information shown in table 3. In this case, the second information output from the output device 34 can include a combination of at least two of the recommended travel route, the recommended travel distance, the recommended travel speed, the recommended travel time, the recommended cadence, the recommended human driving force, and the recommended assist mode. For example, the second information is generated by combining the recommended travel speed, the recommended cadence, the recommended human driving force, and the recommended assist mode for each section of the recommended travel route. The combined information is, for example, displayed on the display 36.

TABLE 3

| Second Information | | Presentation Method |
|---|---|---|
| Information Related to Recommended Travel Condition | Recommended Travel Route | Display Map Image, Display Route Name |
| | Recommended Travel Distance | Display Value |
| | Recommended Travel Speed | Display Value |
| | Recommended Travel Time | Display Value |
| | Recommended Cadence | Display Value |
| | Recommended Human Driving Force | Display Value |
| | Recommended Assist Mode | Display Assist Mode Name or Symbol |

The artificial intelligence processing unit 24 can also generate other information in accordance with the information related to at least one of the recommended travel route, the recommended travel distance, the recommended travel speed, the recommended travel time, the recommended cadence, the recommended human driving force, and the recommended assist mode. For example, the artificial intelligence processing unit 24 generates the recommended travel route appropriate for a travel under the conditions of the recommended travel distance, the recommended travel speed, the recommended travel time, the recommended cadence, the recommended human driving force, and the recommended assist mode.

The input device 22 can be configured to obtain information related to a predetermined travel route from the external device P. In this case, the artificial intelligence processing unit 24 generates the recommended travel route in accordance with the information related to the predetermined travel route obtained from the external device P.

The information related to the predetermined travel route includes, for example, a travel route generated by another user or the like. In this case, for example, the artificial intelligence processing unit 24 generates the recommended travel route by customizing the predetermined travel route generated by another user or the like in accordance with the first information.

The input device 22 can be configured to obtain information related to a plurality of predetermined travel routes from the external device P. In this case, the artificial intelligence processing unit 24 generates the recommended travel route by selecting a predetermined travel route from the information related to the plurality of predetermined travel routes obtained from the external device P.

The information related to the plurality of predetermined travel routes includes, for example, a travel route generated by another user or the like. In this case, for example, the artificial intelligence processing unit 24 generates the information related to the recommended travel route by selecting the travel route appropriate for the user from the plurality of predetermined travel routes generated by another user or the like in accordance with the first information.

Figure 3:
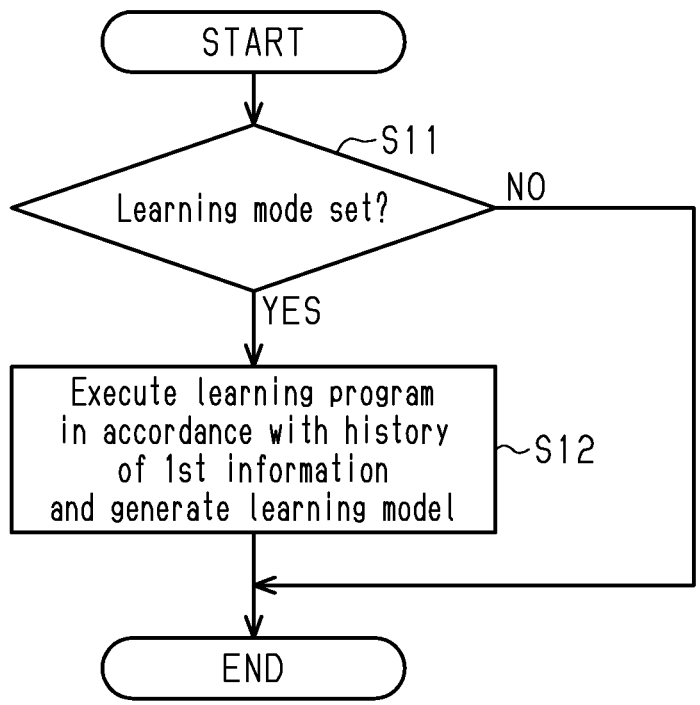
FIG. 3 is a flowchart illustrating a process executed by an artificial intelligence processing unit shown in FIG. 1 for generating a learning model.

With reference to FIG. 3, a process in the learning mode for generating the learning model M1 used to generate the second information in accordance with the first information will now be described. FIG. 3 illustrates the process in unsupervised learning. In a case where electric power is supplied to the artificial intelligence processing unit 24, the artificial intelligence processing unit 24 proceeds to step S11 of the flowchart in FIG. 3.

In step S11, the artificial intelligence processing unit 24 determines whether the learning mode is set. In a case where the learning mode has been set, for example, by the operation of the operation unit 28 by the user, the artificial intelligence processing unit 24 proceeds to step S12. In a case where the learning mode has not been set, the artificial intelligence processing unit 24 ends the process. In step S12, the artificial intelligence processing unit 24 executes the learning program P2 in accordance with the history of the first information and generates the learning model M1. Then, the artificial intelligence processing unit 24 ends the process. The artificial intelligence processing unit 24 stores the generated learning model M1 in the storage 24B. In a case where a learning model M1 that has already been learned is stored in the storage 24B, the artificial intelligence processing unit 24 updates the learned learning model M1 stored in the storage 24B.

Figure 4:
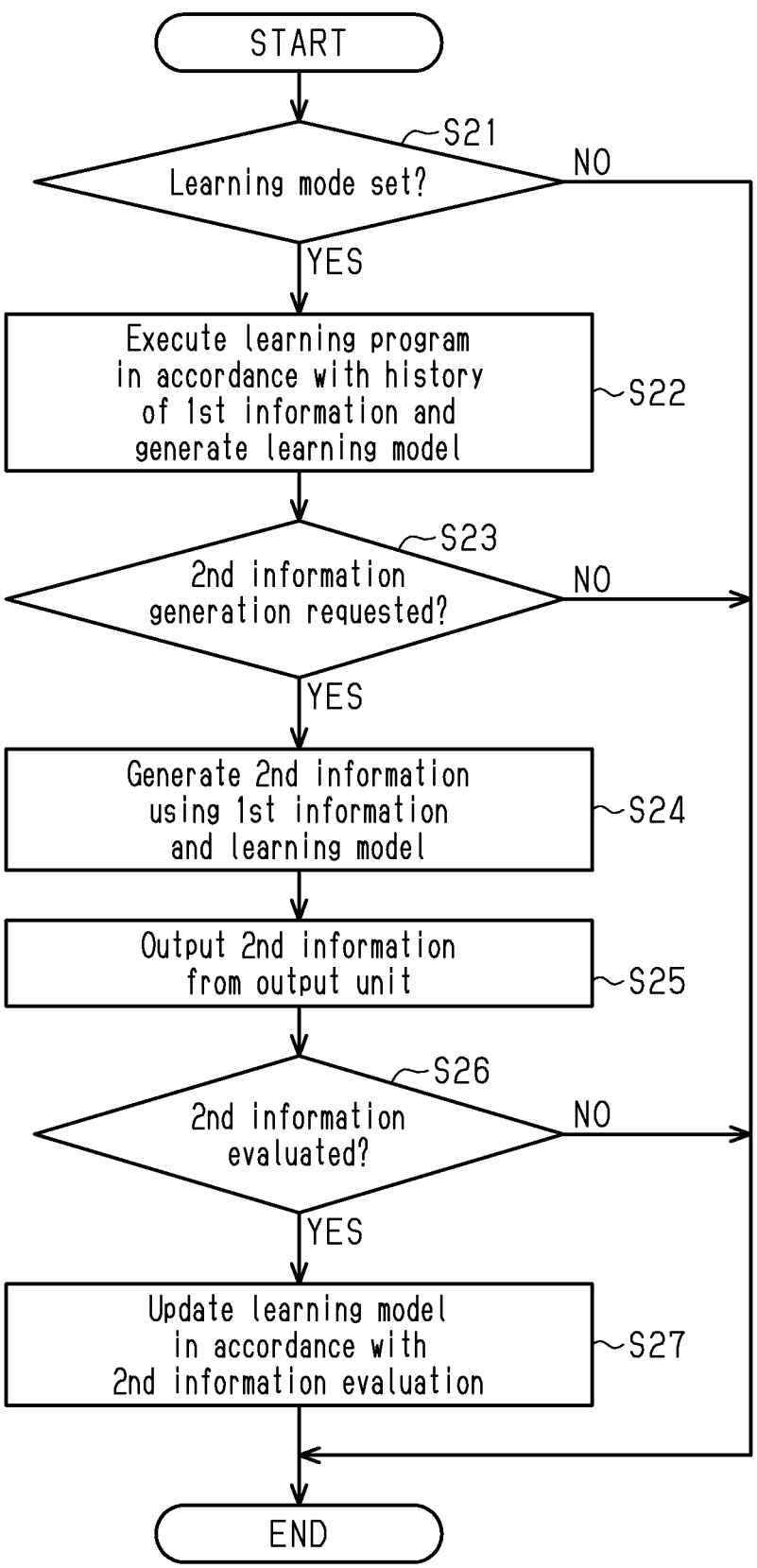
FIG. 4 is a flowchart illustrating a process, which differs from the process illustrated in FIG. 3, for generating a learning model.

With reference to FIG. 4, another process in the learning mode for generating the learning model M1 used to generate the second information in accordance with the first information will now be described. FIG. 4 illustrates the process in reinforcement learning. In a case where electric power is supplied to the artificial intelligence processing unit 24, the artificial intelligence processing unit 24 proceeds to step S21 of the flowchart in FIG. 4.

In step S21, the artificial intelligence processing unit 24 determines whether the learning mode is set. In a case where the learning mode has been set, for example, by the operation of the operation unit 28 by the user, the artificial intelligence processing unit 24 proceeds to step S22. In a case where the learning mode has not been set, the artificial intelligence processing unit 24 ends the process.

In step S22, the artificial intelligence processing unit 24 executes the learning program P2 in accordance with the history of the first information and generates the learning model M1. Then, the artificial intelligence processing unit 24 proceeds to step S23. In step S23, the artificial intelligence processing unit 24 determines whether generation of the second information has been requested. In a case where, for example, the user has performed an operation on the operation unit 28 to request for the second information, the artificial intelligence processing unit 24 determines that generation of the second information has been requested. In a case where generation of the second information has not been requested, the artificial intelligence processing unit 24 ends the process. In a case where generation of the second information has been requested, the artificial intelligence processing unit 24 proceeds to step S24.

The artificial intelligence processing unit 24 generates the second information using the first information and the learning model M1 in step S24 and proceeds to step S25. The artificial intelligence processing unit 24 outputs the generated second information from the output device 34 in step S25 and proceeds to step S26.

In step S26, the artificial intelligence processing unit 24 determines whether the second information generated in step S24 has been evaluated with the operation unit 28. In step S26, in a case where the generated second information has been evaluated, the artificial intelligence processing unit 24 proceeds to step S27. In a case where the generated second information has not been evaluated, the artificial intelligence processing unit 24 does not proceed to step S27. In a case where the generated second information has not been evaluated for a predetermined period, the artificial intelligence processing unit 24 determines the result of determination in step S26 as NO. In a case where the determination result in step S26 is NO, the artificial intelligence processing unit 24 ends the process.

In step S27, the artificial intelligence processing unit 24 updates the learning model M1 in accordance with the evaluation of the second information and ends the process. Then, the artificial intelligence processing unit 24 starts the process from step S21 after a predetermined cycle.

Figure 5:
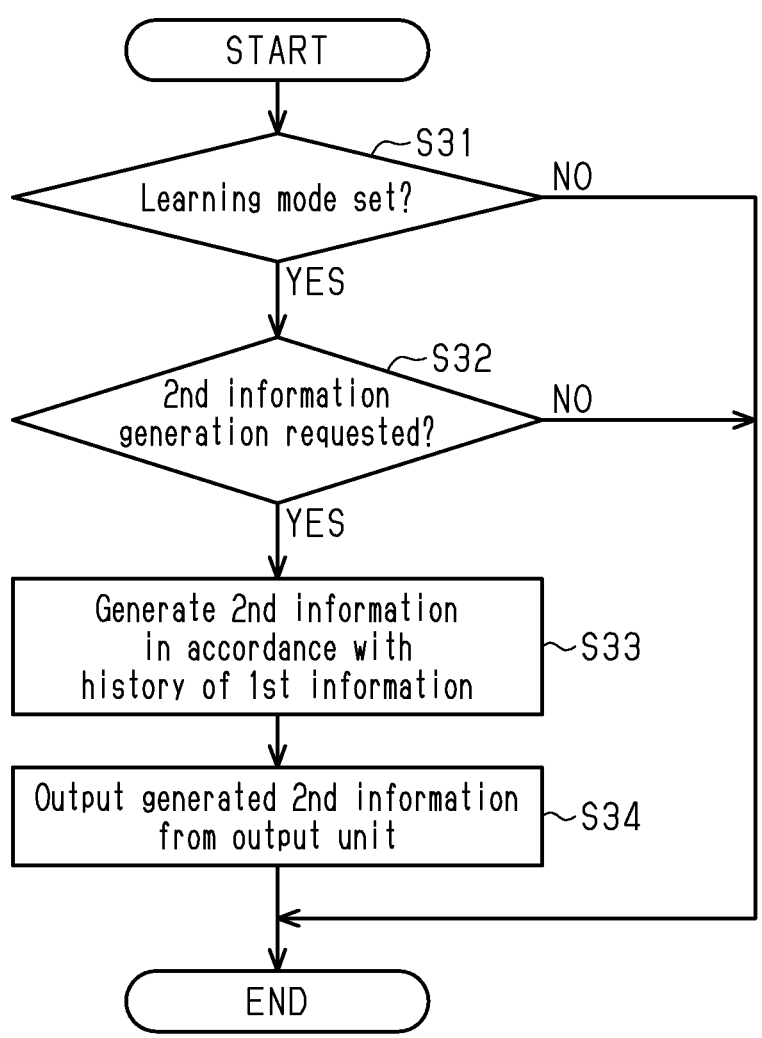
FIG. 5 is a flowchart illustrating a process executed by the artificial intelligence processing unit shown in FIG. 1 for generating second information in accordance with first information.

With reference to FIG. 5, a process in the control mode for generating the second information in accordance with the first information will now be described. In a case where electric power is supplied to the artificial intelligence processing unit 24, the artificial intelligence processing unit 24 starts the process and proceeds to step S31 of the flowchart in FIG. 5.

In step S31, the artificial intelligence processing unit 24 determines whether the control mode has been set. In a case where the control mode has been set, for example, by an operation performed by the user on the operation unit 28, the artificial intelligence processing unit 24 proceeds to step S32. In a case where the control mode has not been set, the artificial intelligence processing unit 24 ends the process.

In step S32, the artificial intelligence processing unit 24 determines whether generation of the second information has been requested. In a case where, for example, the user has performed an operation on the operation unit 28 to request for the second information, the artificial intelligence processing unit 24 determines that generation of the second information has been requested. In a case where generation of the second information has not been requested, the artificial intelligence processing unit 24 ends the process. In a case where generation of the second information has been requested, the artificial intelligence processing unit 24 proceeds to step S33.

The artificial intelligence processing unit 24 generates the second information using the first information and the learning model generated in accordance with the history of the first information in step S33 and proceeds to step S34. In step S34, the artificial intelligence processing unit 24 outputs the second information generated in step S34 from the output device 34 and ends the process.

The artificial intelligence processing unit 24, for example, generates a training menu corresponding to the purpose or preference of the rider. The information processing device 20 generates the second information corresponding to the first information with the artificial intelligence processing unit 24. Thus, the information processing device 20 generates the second information that is more preferable for the user compared to the second information generated through a predetermined algorithm.

Second Embodiment

Figure 6:
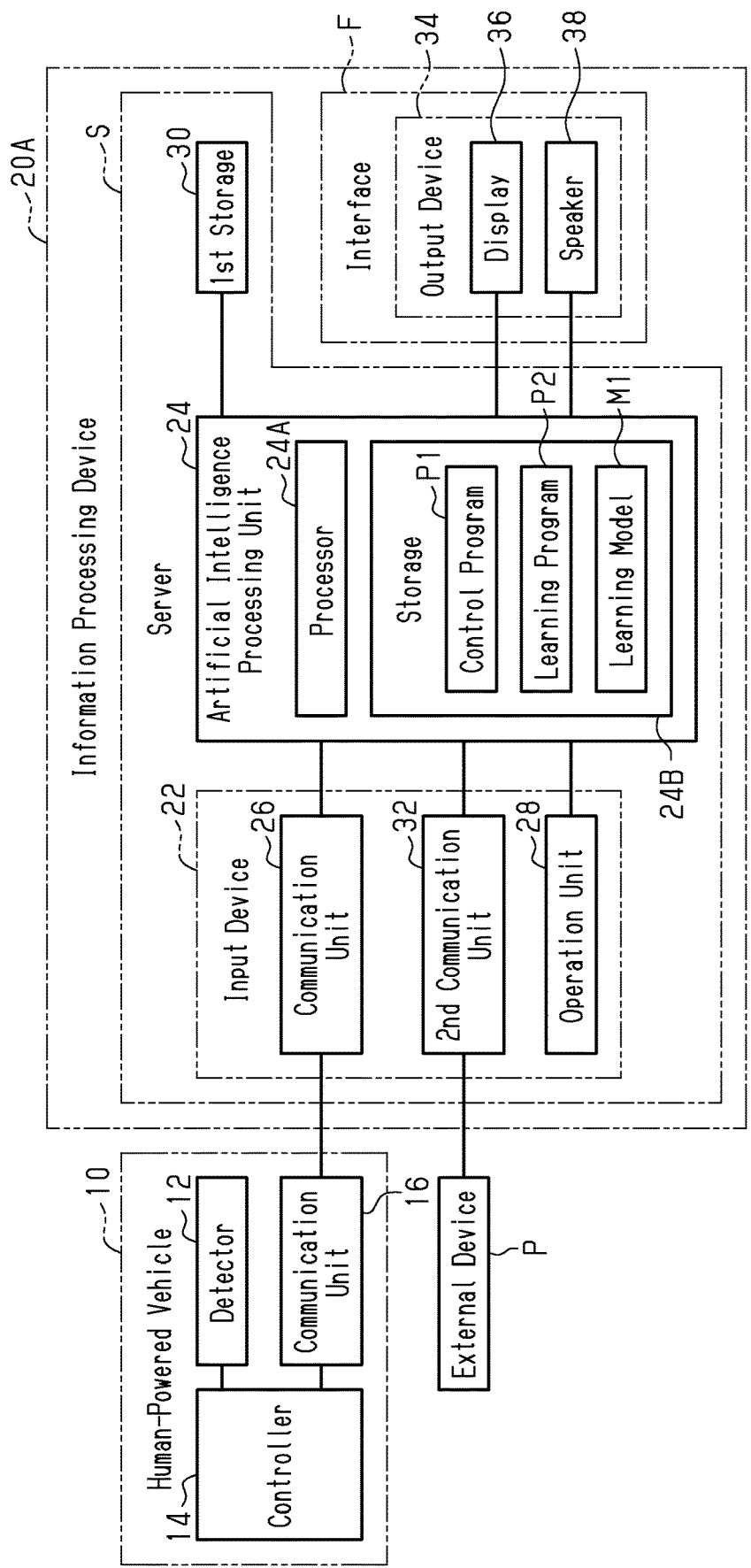
FIG. 6 is a block diagram showing the electrical configuration of an information processing system including an information processing device in accordance with a second embodiment.

With reference to FIG. 6, an information processing device 20A in accordance with a second embodiment will now be described. The information processing device 20A in accordance with the second embodiment is the same as the information processing device 20 in accordance with the first embodiment except in that the artificial intelligence processing unit 24 is included in a server S. Thus, same reference numerals are given to those components that are the same as the corresponding components of the first embodiment. Such components will not be described in detail.

The artificial intelligence processing unit 24 is included in the server S connected to a personal computer or the Internet. The information processing device 20A is configured to include the server S and an interface F. The interface F includes at least one of a smartphone, a tablet, a personal computer, and a cycle computer. The information processing device 20A includes the input device 22 and the artificial intelligence processing unit 24. The information processing device 20A further includes the operation unit 28, the first storage 30, and the output device 34.

Preferably, the input device 22 is included in the server S. The input device 22 can be included in the interface F. In this case, the first information is input to the server S through the interface F.

The artificial intelligence processing unit 24 is included in the server S. The artificial intelligence processing unit 24 can be included in a single server S or multiple servers S. The first storage 30 is included in the server S. The first storage 30 can be included in a single server S or multiple servers S. The first storage 30 can be included in the server S that differs from the artificial intelligence processing unit 24.

The external device P can be included in the server S or can be a server that differs from the server S. In a case where the external device P is included in the server S, the second communication unit 32 can be omitted.

MODIFIED EXAMPLES

The description related with the above embodiments exemplifies, without any intention to limit, applicable forms of an information processing device according to the present disclosure. In addition to the embodiments described above, the information processing device according to the present disclosure is applicable to, for example, modified examples of the above embodiments that are described below and combinations of at least two of the modified examples that do not contradict each other. In the modified examples described hereafter, same reference numerals are given to those components that are the same as the corresponding components of the above embodiments. Such components will not be described in detail.

Figure 7:
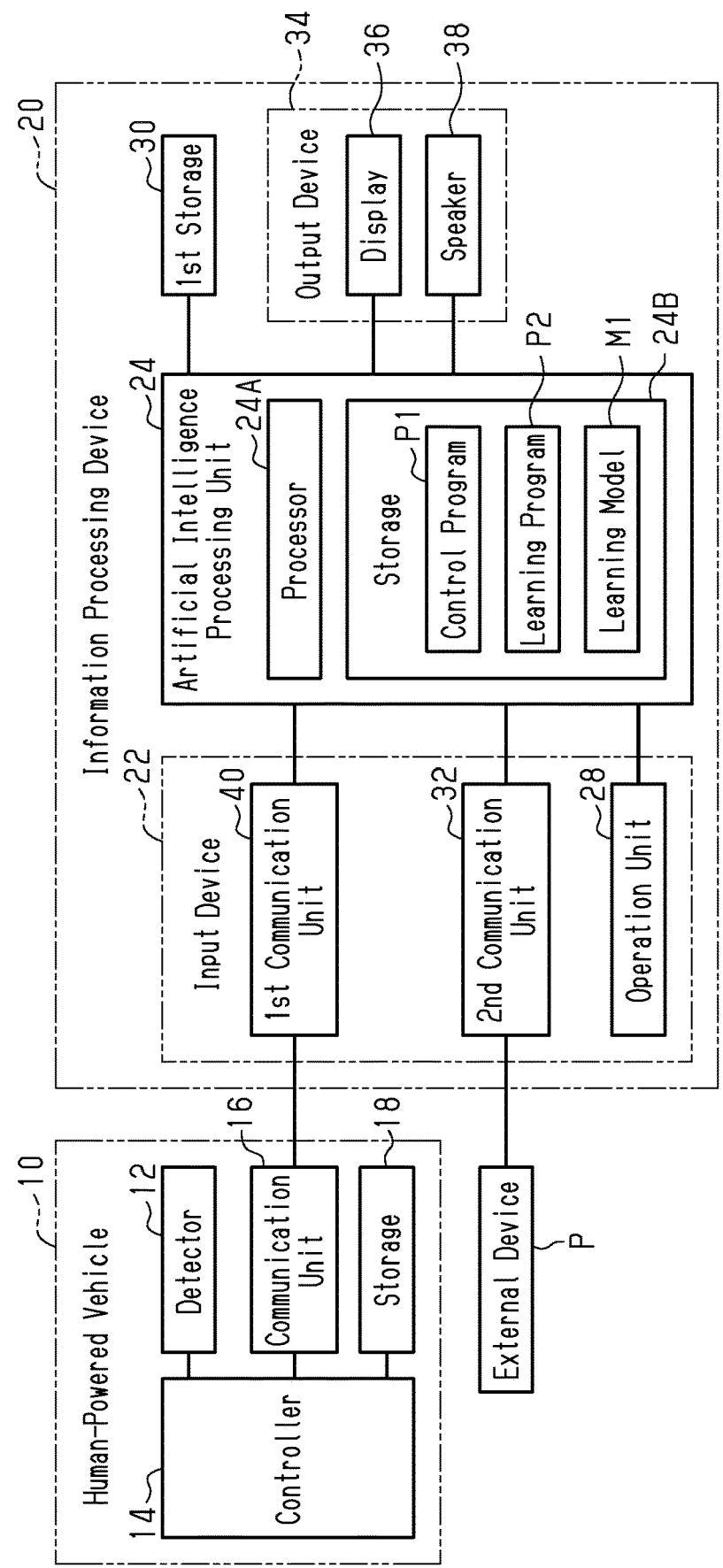
FIG. 7 is a block diagram showing the electrical configuration of an information processing system including an information processing device of a first modified example.

As shown in FIG. 7, the information processing devices 20 and 20A can include a first communication unit 40 configured to obtain the history of the first information input to the input device 22 by performing communication and transmit the obtained history of the first information to the artificial intelligence processing unit 24. The communication unit 16 of the human-powered vehicle 10 is electrically connected to the first communication unit 40 through at least one of wireless communication or wired communication. The input device 22 obtains the history of the first information through the first communication unit 40. One example of the standard of the wireless communication between the communication unit 16 of the human-powered vehicle 10 and the first communication unit 40 is ANT+ or Bluetooth. In the present modified example, the first storage 30 can be omitted. In the present modified example, the human-powered vehicle 10 further includes storage 18 that stores the history of the first information. The storage 18, for example, includes a nonvolatile memory and a volatile memory. The controller 14 transmits the history of the first information stored in the storage 18 through the communication unit 16 to the first communication unit 40 of the information processing devices 20 and 20A.

Figure 8:
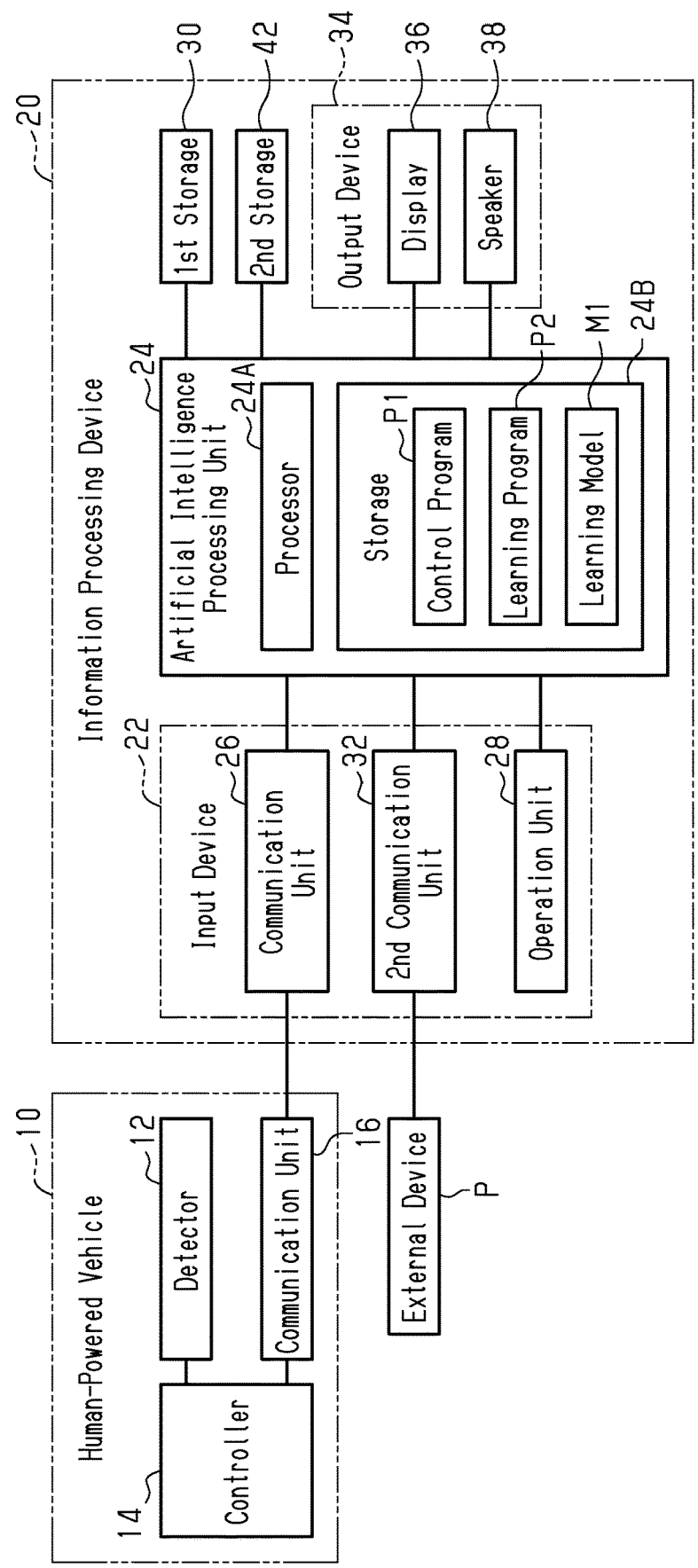
FIG. 8 is a block diagram showing the electrical configuration of an information processing system including an information processing device of a second modified example.

In a case where the recommended travel condition includes the recommended travel route, as shown in FIG. 8, the information processing devices 20 and 20A can further include second storage 42 that stores the map information. The second storage 42, for example, includes a nonvolatile memory and a volatile memory. In this case, the artificial intelligence processing unit 24 generates the recommended travel route in accordance with the map information stored in the second storage 42. In the present modified example, the second communication unit 32 can be omitted. In a case where the information processing devices 20 and 20A include the second storage 42, the map information can be stored in the second storage 42 in a manner such that the stored map information can be updated with the map information obtained through the second communication unit 32 from the external device P.

The input device 22 does not have to be electrically connected to the detector 12. Even in this case, the artificial intelligence processing unit 24 can generate the second information in accordance with the first information input by the operation unit 28.

In a case where the storage 24B stores the learning model M1 that has been learned, the learning program P2 can be omitted. In this case, the artificial intelligence processing unit 24 is actuated only in the control mode.

DESCRIPTION OF REFERENCE CHARACTERS 10) human-powered vehicle; 12) detector; 20,20A) information processing device; 22) input device; 24) artificial intelligence processing unit; 30) first storage; 32) second communication unit; 34) output device; 36) display; 38) speaker; 40) first communication unit; 42) second storage; P) external device; S) server

The invention claimed is:
1. An information processing device comprising:
an input device configured to receive first information related to a state of a rider of a human-powered vehicle and an exercise target of the rider of the human-powered vehicle;
an artificial intelligence processing unit including a processor and a memory in which a learning model is stored; and
an output device including a display, wherein
the first information related to the state of the rider of the human-powered vehicle includes information related to at least one of: a human driving force, a state of fatigue of the rider, and a consumed energy of the rider, and is received by the input device from one or more sensors included in a detector of the human-powered vehicle,
the first information related to the exercise target of the rider of the human-powered vehicle includes information related to at least one of: a weight target, a target consumed energy, and a target travel time, and is input into the input device by the rider of the human-powered vehicle,
the input device outputs the first information to the artificial intelligence processing unit,
the artificial intelligence processing unit updates the learning model to generate second information via a learning algorithm using a neural network in accordance with the first information related to the state of the rider of the human-powered vehicle and the exer- cise target of the rider of the human-powered vehicle received from the input device, the second information includes a recommended cadence, a recommended human driving force, and a recommended travel speed for the rider of the human-powered vehicle, and the artificial intelligence processing unit further generates a recommended travel route in accordance with the second information generated by the artificial intelligence processing unit, the recommended travel route being appropriate for travel under conditions of the recommended cadence, the recommended human driving force, and the recommended travel speed for the rider of the human-powered vehicle.

2. The information processing device according to claim 1, wherein the first information related to the state of the rider of the human-powered vehicle further includes information related to a travel state of the human-powered vehicle; and the input device is electrically connected to the detector, and the detector is configured to detect the travel state of the human-powered vehicle.

3. The information processing device according to claim 2, wherein the travel state of the human-powered vehicle includes at least one of a travel time, a travel speed, a travel distance, a travel cadence, and a travel route.

4. The information processing device according to claim 1, wherein the artificial intelligence processing unit generates the second information in accordance with a history of the first information.

5. The information processing device according to claim 4, further comprising first storage that stores the history of the first information.

6. The information processing device according to claim 4, further comprising a first communication unit configured to obtain the history of the first information input to the input device by communicating and transmitting the obtained history of the first information to the artificial intelligence processing unit.

7. The information processing device according to claim 1, further comprising second storage that stores map information, wherein the artificial intelligence processing unit generates the recommended travel route in accordance with the second information generated by the artificial intelligence processing unit and the map information stored in the second storage.

8. The information processing device according to claim 1, wherein the first information further includes at least one of position information of the human-powered vehicle, information of a time at which the rider starts traveling, and information of a distance over which the rider wishes to travel.

9. The information processing device according to claim 1, wherein the input device is configured to obtain information related to a predetermined travel route from an external device, and the artificial intelligence processing unit generates the recommended travel route in accordance with the second information generated by the artificial intelligence processing unit and the information related to the predetermined travel route obtained from the external device.

10. The information processing device according to claim 1, wherein the input device is configured to obtain information related to a plurality of predetermined travel routes from an external device, and the artificial intelligence processing unit generates the recommended travel route in accordance with the second information generated by the artificial intelligence processing unit and by selecting a predetermined travel route from the information related to the plurality of predetermined travel routes obtained from the external device.

11. The information processing device according to claim 1, wherein the artificial intelligence processing unit is configured to be provided on the human-powered vehicle.

12. The information processing device according to claim 1, wherein the artificial intelligence processing unit is included in a server connected to a personal computer or the Internet.

13. The information processing device according to claim 1, wherein the second information further includes a recommended assist mode.

14. The information processing device according to claim 1, wherein the output device displays the second information including a first value, the first value includes one of the recommended cadence, the recommended human driving force, and the recommended travel speed, the output device displays the second information including a second value, and the second value includes one of the recommended cadence, the recommended human driving force, and the recommended travel speed.

15. The information processing device according to claim 14, wherein the output device displays the second information including a third value, and the third value includes one of the recommended cadence, the recommended human driving force, and the recommended travel speed.

* * * * *